Patented Apr. 14, 1942

2,279,877

UNITED STATES PATENT OFFICE 2,279,877

PREPARATION OF FLUORESCENT COATING MATERIAL

William L. Sullivan, Bloomfield, N. J., assignor to Westinghouse Electric & Manufacturing Company, East Pittsburgh, Pa., a corporation of Pennsylvania No Drawing. Application March 1, 1940, Serial No. 321,669

6 Claims. (Cl. 250—81)

This invention relates to fluorescent material and more particularly to the method of preparing such material for coating the surface of a discharge lamp so that the material is excited by the invisible radiations and fluoresces to thus convert the invisible radiations into visible light of a desired color, dependng upon the composition of the fluorescent material.

At the present time fluorescent powders are prepared by heat treating precipitated material or by firing a suitable mixture of oxides or materials which break down into oxides when fired and an activator. Of these two methods, I have found that the latter results in a greater fluorescent output of the material than when prepared by precipitation, and it is the primary object of the present invention to control the fluorescent output particularly of powder prepared by firing oxides or their equivalent, although control of material prepared by precipitation may be improved in quality by employing similar principles.

I have found that the conditions necessary for the preparation of fluorescent powders of maximum fluorescent output are exceptionally critical since slight variations in the temperature or time of firing, as well as in composition, result in low output and usually a discolored material. For any given formulation, an excessively high temperature or excess time at the optimum temperature results in a yellow discoloration with low output, while prolonged firing at a lower temperature does not develop the maximum output.

Taking as a specific example calcium tungstate, which emits a blue fluorescent light when excited by short-wave ultra-violet, it may be prepared by heat treating precipitated tungstate or by firing a mixture of tungsten oxide ($WO_3$) and calcium oxide (CaO) at a temperature which causes them to react and form calcium tungstate ($CaWO_4$). An activating material, such as lead in the form of an oxide (PbO) or a salt ($Pb(NO_3)_2$) may be added in either case in order to increase the efficiency of the fluorescent material, as indicated by the amount of fluorescent light emitted when a given amount of surface is excited with a standard or comparable source of ultra-violet radiation.

The difficulty of controlling the resulting reaction and obtaining a uniform product with maximum fluorescent output is increased by the fact that when anhydrous $WO_3$ and CaO are fired together, a rapid exothermic reaction takes place which carries the center of the mass beyond the furnace temperature and results in discoloration of the central portion, with a consequent loss of output. On the other hand, the firing of $WO_3$ and calcium hydroxide ($Ca(OH)_2$) does not give a visible exothermic reaction, but the product is low in output and apparently not completely reacted. Prolonged firing, even at higher temperatures, does not correct this condition. If, however, a definite mixture of anhydrous $WO_3$, CaO and $Ca(OH)_2$ or of anhydrous CaO and tungstic acid ($H_2WO_4$) are fired, the visible exothermic reaction does not occur and yet maximum fluorescence develops in a relatively short time, provided optimum conditions with regard to temperature and time of firing are observed.

I have accordingly discovered that this reaction can be controlled by controlling the amount of water in the mixture. In the absence of water, a rapid, visible exothermic reaction takes place. As water is added in increasing amounts, this exothermic effect becomes less noticeable and finally no longer visible. Increasing the water content beyond this point slows the reaction so much that maximum output is not attained.

The water may be added by substituting $Ca(OH)_2$ for part of the CaO in the formula, although it may be added by replacing $WO_3$ with $H_2WO_4$, or by mixing the oxides in a water slurry and then drying to a definite water content before firing. As a specific example of a formulation, the following has proven very satisfactory:

$WO_3$—29.0 gr. (ignited oxide).
CaO—8.5 gr. (sufficient as $Ca(OH)_2$ to supply 1.6 gr. $H_2O$) {anhydrous CaO _____ 3.5 gr.
{$Ca(OH)_2$ _____ 6.6 gr.
PbO—0.5 gr.
Fire at 1000° C. for eight minutes.

While, as above stated, this specific formulation has proven very satisfactory, it is recited as illustrative only and it should be understood that any change in formulation may require a change in water content as well as a change in firing conditions. However, for any given formulation a definite water content can be determined which will develop a maximum output when fired at the optimum conditions for that particular formulation, with the firing temperature ranging approximately between 950° C. and 1100° C. for a period of time depending upon the mass of the material.

It thus becomes obvious to those skilled in the art that a method of preparing fluorescent material is herein provided by which the fluorescent output of the material is controlled by controlling the water content in the mixture prior to firing. Moreover, this water content may be selected either by drying a slurry containing the mixture to a definite water content prior to firing, or it may be added in the form of compounds which releases a predetermined quantity of water in the mixture during firing.

Although an example of the present method is herein described, it is to be understood that other modifications of the present invention may be employed without departing from the spirit and scope of the appended claims.

I claim:

1. The method of preparing a mixture of fluorescent material comprising calcium tungstate having substantially maximum fluorescent output which consists in forming a mixture of tungsten oxide and calcium oxide, controlling the exothermic reaction by preselecting the water content of the mixture to a value approximating 3 to 5% by weight of the mixture, and firing the mixture at a temperature ranging from 950° C. to 1100° C.

2. The method of preparing a mixture of fluorescent material comprising calcium tungstate having substantially maximum fluorescent output which consists in forming a mixture of tungsten oxide and calcium oxide, controlling the exothermic reaction by preselecting the water content of the mixture to a value approximating 3 to 5% by weight of the mixture, and firing the mixture at a temperature ranging from 950° C. to 1100° C. to produce a material giving substantially maximum fluorescence under excitation of invisible radiations.

3. The method of preparing a mixture of fluorescent material comprising calcium tungstate having substantially maximum fluorescent output which consists in forming a mixture of tungsten oxide and calcium oxide, mixing the material with water to form a slurry, drying the slurry thus formed to a definite water content approximating from 3 to 5% by weight of the mixture to control the exothermic reaction of the mixture upon firing, and firing the mixture at a temperature ranging from 950° C. to 1100° C. to produce a material giving substantially maximum fluorescence under excitation of invisible radiations.

4. The method of preparing a mixture of fluorescent material comprising calcium tungstate having substantially maximum fluorescent output which consists in mixing a preselected quantity of tungsten oxide and calcium oxide together with an activator, controlling the exothermic reaction of the mixture upon firing by selection of the compounds to give a preselected water content to the mixture approximating from 3 to 5% by weight of the mixture, and firing the mixture at a temperature sufficient to produce a material giving substantially maximum fluorescence under excitation of invisible radiations.

5. The method of preparing a mixture of fluorescent material of substantially maximum fluorescent output which consists in controlling the exothermic reaction during firing by mixing approximately 29.0 grams of tungsten oxide, approximately 0.5 grams of lead oxide as an activator, and calcium oxide together with calcium hydroxide in sufficient quantity to produce approximately 8.5 grams of calcium oxide and a water content approximately one-fifth that of the total amount of calcium oxide in the mixture, and then firing the mixture with its predetermined water content at a temperature of approximately 1000° C. for about eight minutes.

6. The method of preparing a mixture of fluorescent material of substantially maximum fluorescent output which consists in controlling the exothermic reaction by mixing approximately 22.2 grams of tungstic acid and approximately 0.5 grams of lead oxide as an activator together with approximately 8.5 grams of calcium oxide to form a mixture having a definite preselected water content approximating one-fifth the total amount of calcium oxide in the mixture, and then firing the mixture at a temperature of approximately 1000° C. for about eight minutes.

WILLIAM L. SULLIVAN.